United States Patent [19]

Vinegar et al.

[11] Patent Number: 4,984,594
[45] Date of Patent: Jan. 15, 1991

[54] VACUUM METHOD FOR REMOVING SOIL CONTAMINATION UTILIZING SURFACE ELECTRICAL HEATING

[75] Inventors: Harold J. Vinegar; George L. Stegemeier, both of Houston, Tex.

[73] Assignee: Shell Oil Company, Houston, Tex.

[21] Appl. No.: 427,418

[22] Filed: Oct. 27, 1989

[51] Int. Cl.$^5$ .......................... B08B 13/00; B08B 15/00
[52] U.S. Cl. .......................................... 134/21; 15/320; 15/321; 166/60; 166/65.1; 134/1; 134/42; 405/129
[58] Field of Search .......... 219/10.41, 10.57, 10.61 R; 405/129; 15/320, 321; 166/228, 60, 65.1; 134/2, 4, 21, 42, 6, 1

[56] References Cited

U.S. PATENT DOCUMENTS

| | | | |
|---|---|---|---|
| 4,670,634 | 6/1987 | Bridges et al. | 219/10.41 |
| 4,774,974 | 10/1988 | Teter | 134/21 |
| 4,807,318 | 2/1989 | Kallenbach | 134/21 |
| 4,842,448 | 6/1989 | Koernes et al. | 405/258 |

OTHER PUBLICATIONS

U.S. News and World Report, Feb. 6, 1989, pp. 47–49, Superfund, Superflop.

Primary Examiner—Asok Pal

[57] ABSTRACT

An in-situ method is disclosed for removing contaminants from surface and near-surface soil by imposing a vacuum on the soil beneath a impermeable flexible sheet and then heating the soil with an electric surface heater that is positioned on the soil surface under the sheet. The heater is permeable to vapors which emanate from the soil when heated. A permeable mat, which may also be a good thermal insulator, separates the heater from the impermeable sheet and provides a conduit for flow of vapors to openings in the sheet. The openings, in turn, are connected to a vacuum manifold for collection of the vapors. A vacuum pump evacuates the region under the impermeable sheet such that the sheet, mat, and heater are pressed firmly against the soil surface by atmospheric pressure. The soil contaminants are removed by vaporization, steam distillation, and/or thermal decomposition.

26 Claims, 4 Drawing Sheets

VACUUM METHOD FOR REMOVING SOIL CONTAMINATION UTILIZING SURFACE ELECTRICAL HEATING

BACKGROUND OF THE INVENTION

The contamination of surface and near-surface soils has become a matter of great concern in many locations in the United States and other countries. Increasingly the public has become aware of spills and landfills of toxic and carcinogenic or radioactive materials in the soil. If left in place, many of these contaminants will find their way into aquifers or into the food supply, and could become public health hazards.

There are many proposed methods for removal of surface contaminants, such as excavation followed by incineration, in-situ vitrification, bacterial attack, chemical additives for deactivation, radio frequency heating, etc. Although successful in some applications, these methods can be very expensive (hundreds of dollars per ton) and are not practical if many tons of soil must be treated. The Environmental Protection Agency (EPA) has targeted over a thousand sites for Superfund cleanup. Yet, to date, the EPA has Partially cleaned up only a fraction of these sites, spending a staggering $4 billion in the process (U.S. News & World Report, Feb. 6, 1989, pp. 47-49).

In U.S. Pat. No. 4,670,634, Bridges et al propose a method for in-situ decontamination of spills and landfills by radio frequency heating. The soil is heated by radio frequency energy to a temperature higher than that needed to boil water, which is said to increase the permeability of the region. A vapor and gas collection and containment barrier is installed above the region to be decontaminated. The heating is continued by dielectric heating after water has boiled from at least a portion of the region so as to heat the portion to elevated temperatures substantially above the boiling point of water. The material is rendered innocuous in-situ in a number of ways, as by pyrolysis, thermally assisted decomposition, distillation, or reaction with an introduced reagent, such as oxygen. The materials may also be driven from the region, as by distillation or by evaporation and steam drive and then collected and disposed of by incineration.

While U.S. Pat. No. 4,670,634 is a significant advance relative to previous remediation methods, it has several disadvantages. The use of radio frequency power in the MHz range makes the process hard to control as the soil dries out; results in less uniform heating because of "hot spots" which are overheated every half wavelength and "cold spots" which are underheated; results in loss of efficiency in the generation of radio frequency power; and emits electromagnetic noise that can interfere with radio communications. Also, because the process in U.S. Pat. No. 4,670,634 operates near atmospheric pressure, it requires cumbersome vapor collection barriers at the surface.

What is desired, therefore, is a method for effectively removing contamination which avoids the excavation of large quantities of soil; which can be utilized at depths greater than a few feet; which can remove contaminants with boiling points substantially greater than that of water (up to several hundred degrees centigrade); which is generally applicable to a wide range of contaminants (even those with low vapor pressure at room temperature); which can reduce the level of contamination down to low levels; and which is rapid and inexpensive to operate in a wide variety of soils and surface conditions.

SUMMARY OF THE INVENTION

In the present invention, an in-situ method is disclosed for remediation and decontamination of surface and near-surface soils by evacuating the soil under a flexible sheet, which is impermeable to gases, and heating the soil surface with a relatively flat electric surface heater, which is permeable to gases.

The heater may be constructed, for example, from a mesh of electrically conductive metal wires. The surface heater is equipped with provision for electrical connections to supply electric power to the heater, and is placed in contact with the soil surface. Electrical power is supplied to the heater at power line frequencies of about 60 Hz. The surface heater is permeable to vapors that emanate from the soil when heated. Above the surface heater is placed a mat which is substantially more permeable to gases than the soil and which may also be a good thermal insulator. Above the permeable mat is placed a flexible impermeable sheet with at least one opening serving as a vacuum line connection. The impermeable sheet extends areally beyond the surface heater and permeable mat, is impermeable to gases, and has the capability of sealing to the soil surface. A layer of thermal insulation may be placed above the impermeable sheet.

According to the teachings of this invention, a vacuum is applied through a manifold connected to the impermeable sheet. Creating a vacuum below the impermeable sheet will cause the sheet to be sucked tightly to the ground surface. The soil surface is sealed by the impermeable sheet as atmospheric pressure pushes the sheet against the soil surface. At the center of the pattern, the impermeable sheet will press the permeable mat and heater against the soil surface. In the peripheral region beyond the surface heater and permeable mat, the impermeable sheet will form a seal against the soil surface. Thus substantially only the air, soil moisture, and contaminants in the soil below the surface heater will be pulled toward the soil surface, minimizing the risk of spreading the surface contamination.

While applying a vacuum to the soil, the temperature of the soil is raised by applying heat to the surface of the soil with a surface heater. The surface heater can reach temperatures as high as 1000° C. or more, if necessary. A thermal front moves downward into the soil by thermal conduction, thereby vaporizing water and contaminants in the near-surface soil. For contaminants that are subject to thermal decomposition, at least a portion of the soil may be heated to a temperature sufficient to fragment contaminants into their decomposition products. Also, additional decomposition may occur as the vaporized contaminants pass through the very high temperatures at the surface heater. The vacuum is maintained throughout the period of heating and for a sufficient time after heating to avoid contaminant losses or dispersion.

The vacuum will cause vaporization or boiling to occur at a lower temperature than the normal boiling point at atmospheric pressure. At the same time, the high boiling point contaminants will be removed by steam distillation in the presence of water vapor within the soil at a temperature well below the normal boiling point of such contaminants. This will occur for all contaminants that are nearly immiscible in water, since the boiling point of the mixture of two immiscible fluids will always be less than the boiling point of either component. Contaminants with normal boiling points well above 300° C. can thus be removed by this process.

Unlike other decontamination processes that require flow of electrical current within the soil, this process can be applied to soils which have low in-situ moisture content. Moreover, the decontamination process can be continued at temperatures well above the point at which moisture in the soil evaporates.

The water vapor and contaminants and/or decomposition products may be collected, for example, in a cold trap located between the opening in the impermeable sheet and a vacuum pump. Alternatively, the water and contaminant liquids can be separated on the basis of density in a separator, while the gases can be reused, or incinerated, or otherwise disposed. Alternatively, the contaminants and/or their decomposition products can be trapped and concentrated, for example, on molecular sieve material, on activated carbon, or in a wet scrubber. Thereafter the concentrated contaminants and/or their decomposition products can be reused, or incinerated, or otherwise disposed. Alternatively, the contaminants and/or their decomposition products can be incinerated in line.

In one heating method, the surface heater is used to heat the soil continuously at a constant or varying temperature. In an alternative method, the heater is used to heat the soil surface to a high temperature, such as about 1000° C., then the heater is turned off, allowing a thermal front to propagate deeper into the soil. The heating process can be tailored to use the minimum amount of electrical energy to heat the soil to a predetermined minimum temperature at a minimum depth, required for volatilization and/or decomposition of the contaminants. When the initial moisture content is insufficient, or removed by heating, it may be advantageous to add water to enhance steam distillation. The process may consist of repetitive cycles of heating, adding moisture to the soil, heating, adding moisture, etc. to take advantage of steam distillation in reducing contaminant concentrations.

In an additional method of practicing this invention, once the near-surface soil has been evacuated and is at elevated temperatures, various gases and liquids can be supplied through an opening in the flexible sheet or through the surface at the periphery of the flexible sheet. Thus, for example, oxygen, hydrogen peroxide, or other reactants could be added to the soil to remove or decompose the contaminants further by chemical reaction at elevated temperature. This could be done in conjunction with additional heating to accelerate the reaction kinetics for decomposition of the contaminants.

Still another practice of this invention could embody other sequences of withdrawal of liquids prior to electrical heating. For example, liquid water could be removed by evacuation through the flexible sheet, thereby desaturating the soil and reducing the electrical power required for vaporization of the moisture.

Some of the contaminants that can be removed by this process include hydrocarbons, pesticides, chlorinated hydrocarbons such as PCBs, chemical warfare products, radioactive wastes such as tritium and tritiated water, and heavy metal contaminants such as mercury, arsenic, etc. The invention is in general applicable to any contaminant which has a vapor phase at elevated temperatures and reduced pressures, and/or may be decomposed at elevated temperatures and reduced pressures.

DETAILED DESCRIPTION OF PREFERRED EMBODIMENTS

Figures 1, 2:
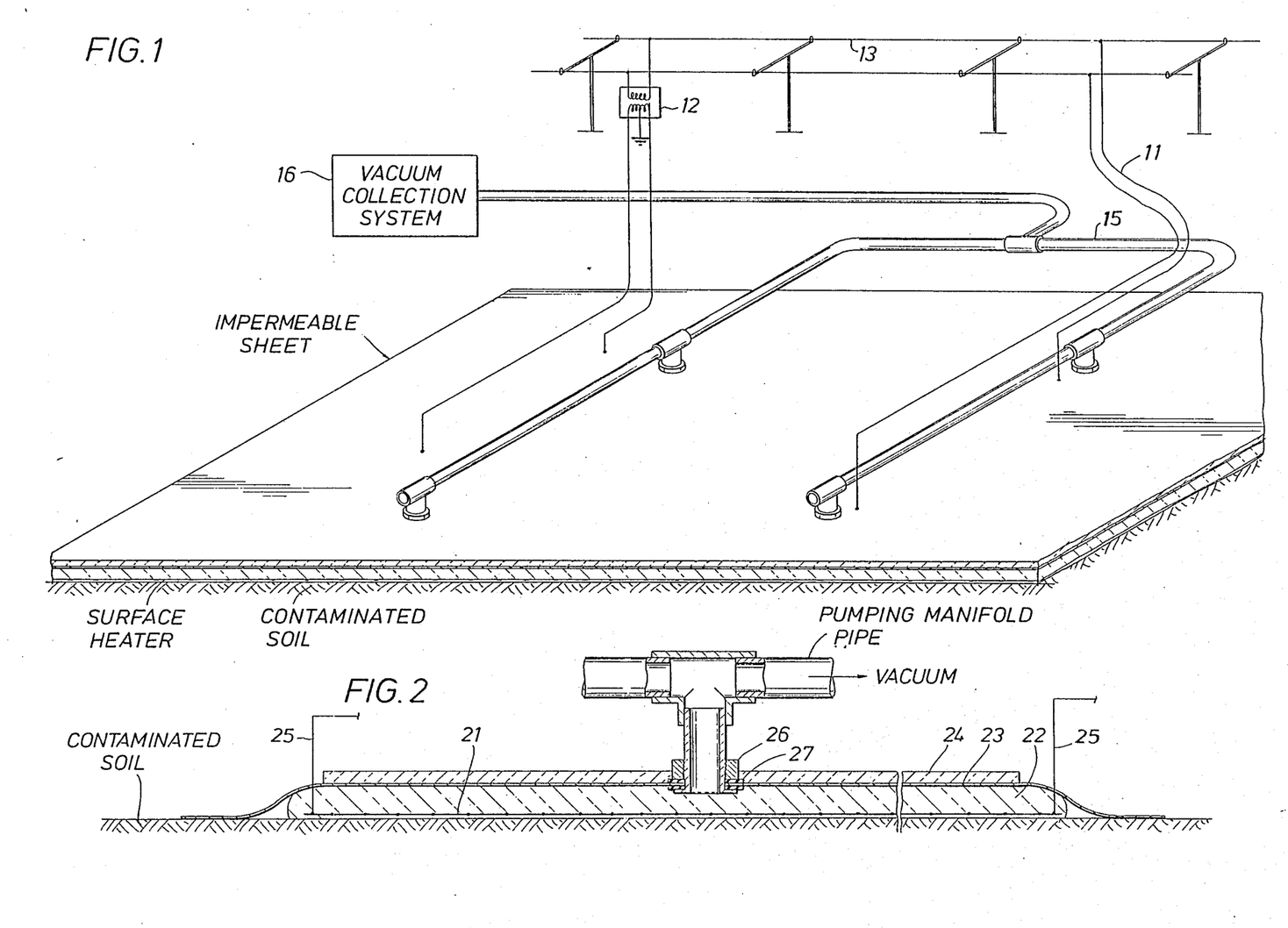
FIG. 1 shows an areal drawing of a heated section according to the present invention.
FIG. 2 shows a cross-sectional view through a heating section.

Referring now to FIG. 1, there is shown an areal drawing of a heated section according to the present invention. The size of a heated section can be, for example, of the order of 50–100 feet on a side but could be greater or smaller than this size. For a large contaminated site, of the size of an acre or more, multiple heating sections could be operated simultaneously, or the heated section could be moved after decontaminating subregions. The precise size of a heating section will be determined by an economic optimum which depends, in turn, on the cost of deploying the heating section versus the amount of area decontaminated at one time. The shape of the heated section may be square, rectangular, hexagonal, round, or some other shape.

The surface heater in the heating section is energized from a low-frequency source at 60 Hz or below by means of a common bus line 11 which may connect, for example, to a transformer 12, a power conditioner (not shown), a phase-angle fired silicon controlled rectifier (SCR) power supply, or directly to the power line 13. Surface facilities (not shown) are also provided for monitoring current, voltage, and power to the surface heater.

The fluid and vapor collection facilities are also shown in FIG. 1. The pumping manifold 15 connects to a vacuum collection system 16. The vacuum collection system includes, for example, a cold trap, a separator, and a vacuum pump. The vacuum pump should be capable of pulling a vacuum of approximately 2 psia or lower at the soil surface. It may be necessary to heat the short section of the pumping manifold from the impermeable sheet to the cold trap to prevent condensation of the contaminants before reaching the cold trap. For example, the pumping manifold 15 may be constructed of metal pipe heated by an electric tracing and thermally insulated.

A side port of the cold trap may be connected to a gas chromatograph, mass spectrometer, or both, or to other monitoring equipment, which can be used to monitor the level of contaminants and/or decomposition products in the vapor. If radioactive contaminants are being removed, the monitoring equipment could be a scintillation counter or Geiger counter. The water vapor and contaminants and/or decomposition products are collected in a separator (not shown) connected to the pumping manifold. The water and contaminant liquids can be separated from the vapors and gases on the basis of density in the separator. Alternatively, the contaminants can be trapped and concentrated on molecular sieve material, on activated carbon, or in a wet scrubber. The contaminants may be recovered and reused, or may be incinerated, or disposed of by other means.

Alternatively, an atomic plasma discharge apparatus (not shown), using radio frequency electric power to dissociate the contaminant gases to their atomic form, could be located in line before the low temperature trap for destruction of the contaminant gases. After dissociation, the atoms recombine into simpler, nonhazardous molecules. Since a plasma discharge normally requires low pressures, this method of disposal has a particular advantage of making use of the low pressures that the contaminant gases are reduced to in the practice of this invention.

Referring now to FIG. 2, there is shown a side view through a heating section in a plane coincident with an opening in the impermeable sheet. The surface heater 21 is covered with a permeable mat 22, which is covered with an impermeable sheet 23. The surface heater and permeable mat are both permeable to gases. The impermeable sheet is impermeable to gases. A layer of thermal insulation 24 may be included on top of the impermeable sheet.

Once the region is evacuated, the surface heater 21 is pressed against the surface soil by atmospheric pressure exerted on the overlying impermeable sheet. This pressure insures good thermal contact between the heater and the soil. By evacuating from the surface, this process pulls additional moisture from soil below the decontaminated surface layer in order to minimize migration of the contaminants to deeper depths and also ensures good areal confinement of the contaminants.

The surface heater 21 may be a mesh constructed from a conducting metal, such as stainless steel or nichrome, which can tolerate very high temperatures (as high as 1000° C. or more). To be compatible with most power sources, the metal should have sufficient resistivity so that the mesh has a total effective resistance of several ohms. The metal should also have good mechanical strength for durability when dragged over rough terrain. Moreover, the metal should be inexpensive and readily available. Stainless steel may be considered for corrosion resistance. A 325 mesh of 304 stainless steel with wire 0.0014-inch in diameter has been found satisfactory, although other sizes and materials could be used. Depending on the mesh conductivity, the mesh could be made in sections connected together either in series, in parallel, or in series/parallel combinations.

The surface heater may also be constructed of metal wires which loop back and forth and do not form a mesh. For example, the metal wires could be stitched into a ceramic fiber cloth such as wire-reinforced NEXTEL 440 sold by Minnesota Mining Manufacturing Co. of St. Paul, Minn. The surface heater could also consist of metal strips or ribbons or a metallic coating in a defined pattern. Still another possibility is to construct the surface heater from a thin metal foil or sheet with perforations to allow gas flow through the foil or sheet.

Conducting cables 25 connect the surface heater with the power source. The connections from the power source to the surface heater should be made in a manner that results in uniform heating of the surface soil. The cables should be insulated and should be constructed of a nonferromagnetic conductor such as copper or aluminum to reduce magnetic hysteresis losses in the cable. The cables can be brought through sealed holes in the impermeable sheet, or could be brought out from under the impermeable sheet through a shallow trench in the soil later covered with dirt. Avoidance of trenching, however, offers distinct advantages when working in severely contaminated areas. Thermocouples or other temperature monitoring means (not shown) may be placed in the soil under the impermeable sheet and at various locations above and below the surface heater to aid in monitoring and controlling the temperatures.

Above the surface heater, there is placed a highly permeable mat 22 which serves as a conduit for flow beneath the impermeable sheet. The permeable mat may be, for example, a thin layer of high permeability sand or other granular material, such as amorphous aluminosilicate or alumina catalyst, covering the surface heater. The permeable mat should be sufficiently permeable to allow gases which emanate from the soil to pass through essentially vertically. A substantial permeability must remain even after atmospheric pressure pushes the mat against the ground and compresses it. The permeable mat extends areally beyond the surface heater.

The permeable mat may also be a good thermal insulator to protect the impermeable sheet from excessive temperatures and reduce heat losses to the air. In this case, the permeable mat may be constructed of various types of insulation, for example, glass fiber, ceramic fiber such as NEXTEL, mineral wool, or other high temperature thermally insulating material. Alternatively, the permeable mat could be a honeycomb or other repeating structure composed of thermally insulating material.

A preferred configuration for a permeable mat with good thermal insulation properties is a layer of NEXTEL ceramic fiber combined with a layer of corrugated 304 stainless steel knitted wire mesh (0.011 inch mesh $\times$ 60 density, 2 ply, 6.5 lb/ft$^2$), with about a $\frac{1}{4}$-inch crimp. The knitted wire mesh has extremely high gas permeability and can easily support a force of 15 pounds per square inch. Moreover the thermal conductivity of such a knitted wire mesh is low. If the surface heater is operated at temperatures as high as 1000° C., additional insulation will be required. The permeable mat may be composed of multiple layers, including insulating layers, to reduce convection and radiation. Thus, the permeable mat may comprise a layer of NEXTEL ceramic fiber, then a layer of corrugated knitted wire mesh, then a layer of perforated aluminum foil for a radiation reflecting shield, then another layer of NEXTEL, another layer of knitted wire mesh, another aluminum foil shield, etc.

The impermeable sheet 23 is placed above the surface heater and the permeable mat. The impermeable sheet may be constructed of silicone rubber, silicone rubber reinforced with fiberglass, or other high temperature material which is flexible yet impermeable to gas flow, such as VITON, VITON reinforced with fiberglass, or TEFLON reinforced with fiberglass. The impermeable sheet must be able to tolerate temperatures above the condensation temperature of the contaminants. The required thickness of the impermeable sheet will depend on operating conditions; however, typically the thickness will be in the range of about 3 to about 125 mils, although it could be less than or greater than this amount. The thicker the material the more durable; however, the thicker the material the greater the cost and the greater the weight involved in transporting the section. Depending on the natural permeability of the soil, the impermeable sheet extends out a substantial distance greater than the surface heater and permeable mat in all directions in order to provide greater sealing surface for better vacuum. This distance could be, for example, five or ten feet beyond the surface heater in all directions.

For contaminants with extremely high boiling points, the impermeable sheet could be constructed of a thin metal sheet instead of an elastomer. The metal sheet could tolerate higher temperatures than an elastomer sheet and would allow operation at temperatures up to 1500° C. or higher. The thin metal sheet could be, for example, ¼ mil stainless steel foil.

One or more holes are premanufactured in the impermeable sheet to insert a vacuum pumping manifold connection 26, and possibly for bringing the electrical leads through the sheeting. Depending on the size of the heating section, a plurality of holes for connection to the pumping manifold may be required. As a typical requirement, depending on soil permeability and the vapor conductivity of the permeable mat, one opening per 50 feet square may be required. Reinforcement may be used around the holes to prevent tearing. The holes also may have a rubber gasket 27 surrounding them, sealed to the impermeable sheet with high temperature silicone adhesives, which will also be used for sealing the electrical connections. Thermocouples or other temperature monitoring means (not shown) may be placed on or under the impermeable sheet to aid in controlling the temperature of the impermeable sheet.

The impermeable sheet may also have a layer of thermal insulation 24 placed above it to prevent heat losses and to insure that the vaporized contaminants do not condense under the impermeable sheet. The thermal insulation could be, for example, mineral or cotton wool, glass wool or fiberglass, polystyrene foam, or aluminized mylar ("superinsulation"). The thickness of this layer of thermal insulation is selected to keep the impermeable sheet at a temperature above the condensation temperature of the contaminants and their decomposition products, but low enough to prevent the impermeable sheet from melting or degrading. The thermal insulation may be, for example, up to 1 inch thick or more. The insulation may be in sections or bats for easier deployment. With only mild heating, it may be possible to eliminate the thermal insulation.

The surface heater, permeable mat, thermal insulation, and impermeable sheet could be constructed in one piece, rather than in separate layers as described above.

In operation, the surface heater is laid out over the soil in the pattern desired. Next the permeable mat is laid over the heater. The permeable mat may or may not be a thermal insulator. Layers of thermal insulation may be included in the permeable mat. Finally, the impermeable sheet is laid over the permeable mat. Additional thermal insulation may be added above the impermeable sheet. The vacuum connections are then made at the openings in the impermeable sheet, and the electrical connections are made to the surface heater.

Before applying electrical heat to raise the soil temperature, a vacuum is created in the soil under the impermeable sheet. By first pulling moisture and contaminants toward the surface, the risk of spreading the contamination deeper while heating is greatly reduced.

A vacuum is applied through the pumping manifold connected to the impermeable sheet. The soil surface is sealed as the impermeable sheet is pressed against the permeable mat and/or insulation layer and surface heater, and toward the soil by the atmospheric pressure. Air, moisture, and contaminants in the soil below the surface heater will be pulled to the surface by the applied vacuum. The water vapor, contaminants and/or decomposition products collected by the pumping manifold flow to the cold trap, separator, and vacuum pump for collection, separation and disposal or reuse.

While applying a vacuum to the soil, the temperature of the soil is increased by applying heat with the surface heater. The soil is heated to the extent necessary to effectively remove and/or decompose the contaminants. A thermal front moves downward through the soil by thermal conduction, thereby resulting in vaporization of water and contaminants present in the soil.

If the contaminants present are subject to thermal decomposition, and at least a portion of the soil is heated to a temperature at or above the decomposition temperature, then some portion of the contaminants will decompose into decomposition products. The decomposition may occur in the soil, and/or as the vapors pass through the electric surface heater. The surface heater can reach temperatures as high as 1000° C. or more, if necessary. At these temperatures, the hydrocarbon contaminants will decompose into simpler species such as carbon dioxide and water (and hydrogen chloride if chlorinated hydrocarbons are present). Contaminants which do not decompose as they pass through the soil may decompose as they pass through the surface heater. Also, as an alternative, a layer of catalyst, such as amorphous aluminosilicate powder or alumina, can be placed above the surface heater to accelerate the decomposition.

Figure 3:
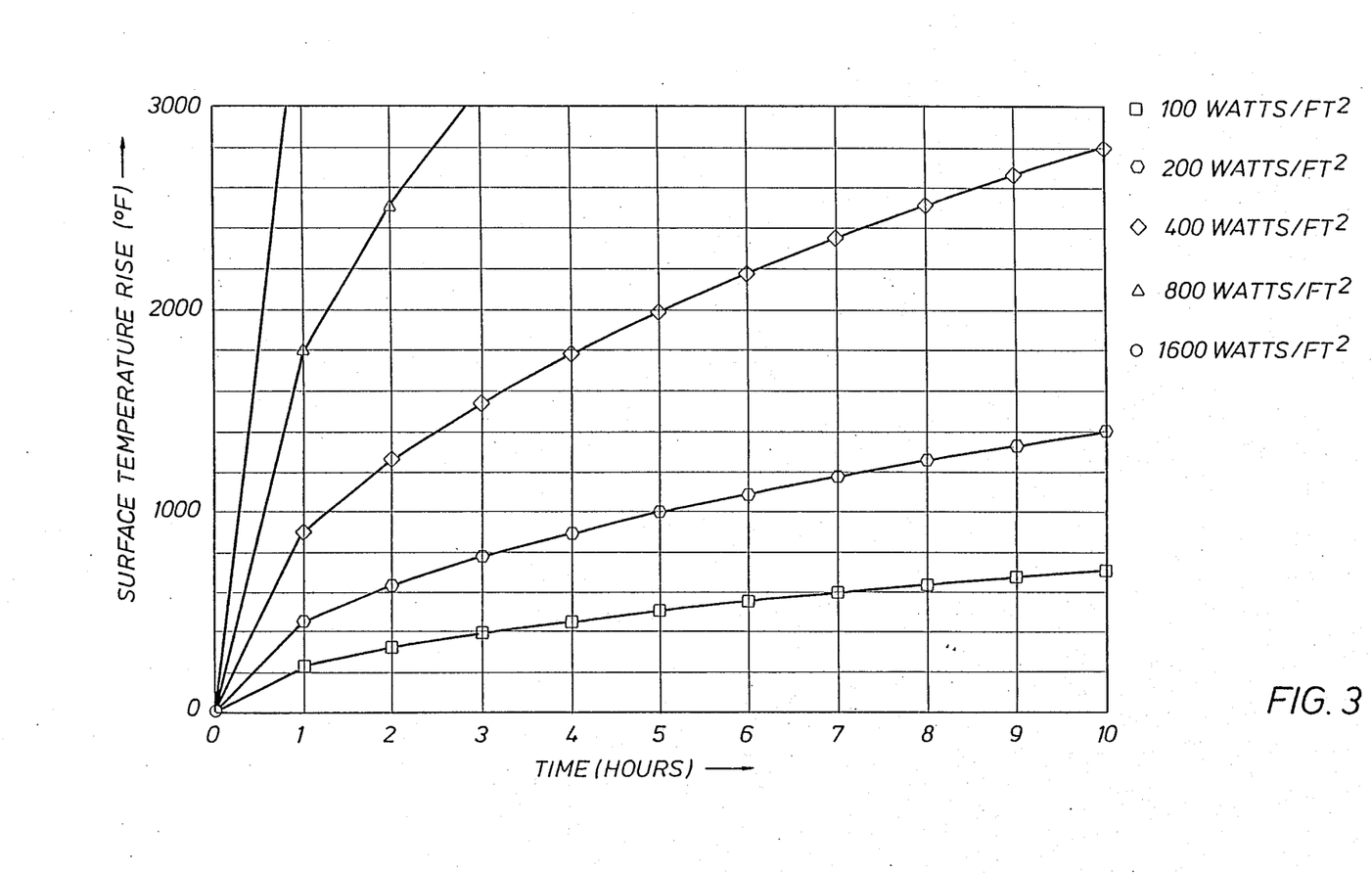
FIG. 3 shows the temperature at the soil surface after heating at various constant heat fluxes.

FIG. 3 shows the calculated temperature at the soil surface after surface heating at various constant heat fluxes for a soil with a uniform thermal conductivity of 0.152 BTU/hr-°F.-ft and a thermal diffusivity of 0.0077 ft$^2$/hr. If heating is initiated at a high heat flux, such as 800 watts/ft$^2$, the heat flux must be reduced after a few hours to avoid overheating at the surface. For routine, continuous operations, a heat flux of about 200 watts/ft$^2$ would provide uniform heating of the soil to target temperatures without overheating at the soil surface.

Figure 4:
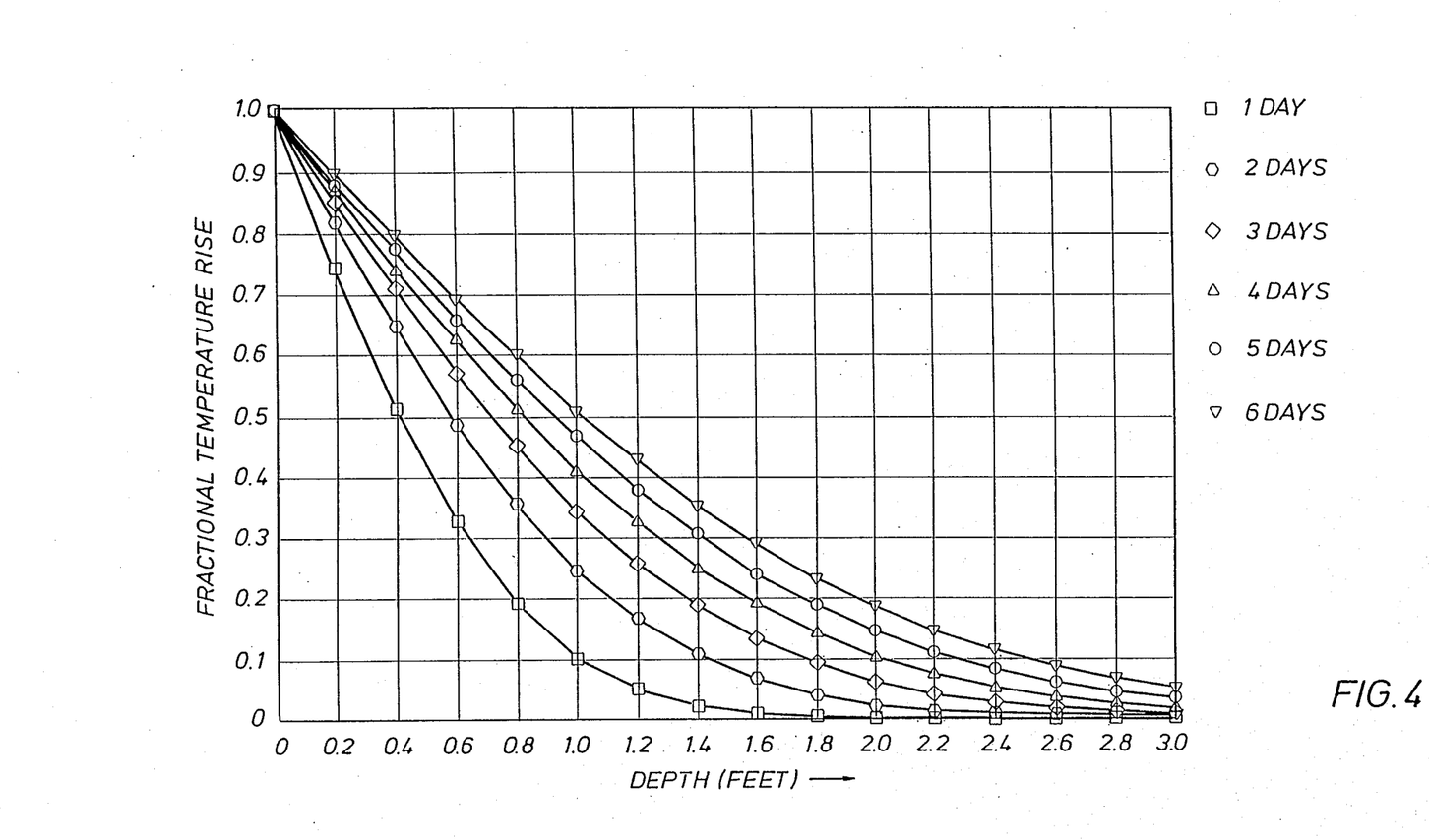
FIG. 4 shows the fractional temperature rise versus soil depth for various heating times.

FIG. 4 shows the calculated fractional temperature rise versus depth for various heating times resulting from heating the same soil and maintaining a constant surface temperature. With longer heating times, the thermal front would move deeper into the soil. For example, if the surface heater is maintained at 1000° C., the top foot of soil will reach a temperature of at least 500° C. within 6 days, and a contaminant in the top foot of soil with a boiling point of 500° C. or less will be vaporized within 6 days.

A vacuum is maintained throughout the heating period, and for a sufficient time afterward to avoid contaminant losses or dispersion. The vacuum will cause vaporization or boiling of the water and contaminants to occur at a lower temperature than the normal boiling point at atmospheric pressure. At the same time, the high boiling point contaminants will be removed by steam distillation in the presence of water vapor at a temperature well below the normal boiling point of the contaminants. This will occur for all contaminants that are nearly immiscible in water, since the boiling point of the mixture of two immiscible fluids will always be less than the boiling point of either component.

This is made more clear by considering, as an example, the vapor pressure of a mixture of water and n-dodecane (a typical hydrocarbon), compared with that of water and n-dodecane each alone as a function of temperature. N-dodecane alone has a normal boiling point of 216° C. and a solubility in water of 4-5 parts per billion. The boiling point of the mixture of water and n-dodecane at atmospheric pressure is just below the boiling point of water, about 99° C. Thus the temperature of the soil does not have to be raised to 216° C. to remove the n-dodecane, but rather to more modest temperatures, especially if the pressure is reduced. Contaminants whose boiling points are well beyond 300° C. can thus be removed by this process of steam distillation below the boiling point of the contaminant.

If the soil contains a large amount of free water, it may be economically attractive to start by pumping through the manifold to remove some of the free water, followed by surface heating. This saves the electrical energy required to vaporize the excess free water from the soil. When the initial moisture content is insufficient, or removed by heating, it may be necessary to add water to enhance steam distillation. The process may consist of repetitive cycles of adding water, heating to create steam distillation, adding more water, reheating, etc. This repetition can result in still lower levels of residual contamination.

In an additional method of practicing this invention, once the heating section, pumping manifold, and vacuum collection system are in place, and a section is evacuated and heated, various gases and liquids can be supplied to the soil through openings in the impermeable sheet. Such materials can be supplied to the soil by, for example, temporarily shutting off the vacuum pump, supplying the gas or liquid through an opening in the impermeable sheet, and then allowing the vacuum built up within the soil to pull the gas or liquid into the soil. Alternatively, if the soil were dried by heating, a liquid could be supplied in a similar fashion, and capillary forces present in the soil would draw the liquid into the soil.

Alternatively, liquids could be introduced directly into the soil at the periphery of the impermeable sheet. The addition of water at the periphery could also be used to reduce the soil permeability to air beyond the edge of the impermeable sheet. In another alternative, shallow injection wells could be installed around the periphery of the heated section for injection of gases or liquids. These fluids could then be pulled into the contaminated soil under the surface heater by the vacuum pump. Thus, for example, water, oxygen, hydrogen peroxide, superheated steam, alkalis or acids or other reactants could be added to the soil to further remove or decompose the contaminants, as required. This could be done in conjunction with additional surface heating to accelerate the reaction kinetics for the decomposition of the contaminants.

One of the advantages of the reduced pressure vaporization in this invention is the reduction in steam required to remove a given amount of contaminant. For example, suppose the soil contaminant is n-dodecane ($C_{12}H_{22}$, Molecular Weight=166), the soil temperature is heated to 100° C. and the pressure is atmospheric pressure (760 mm Hg). The vapor pressure of n-dodecane at this temperature is 18.5 mm Hg. The quantity of n-dodecane in 1 lb-mole of the vapor is 18.5 mm/760 mm=0.0243 lb-mole, or $0.0243 \times 166 = 4.04$ lb. The quantity of water (Molecular Weight=18) is 0.9757 lb-mole, or $0.9757 \times 18 = 17.56$ lb. Thus the number of pounds of steam used to produce one pound of n-dodecane is 17.56/4.04=4.35.

For comparison, assume the same temperature as before, but a pressure reduced to 50 mm Hg by evacuating through the flexible sheet. The quantity of n-dodecane in the vapor is now 18.5 mm/50 mm=0.370 lb-mole, or 61.4 lb. The quantity of water is 0.630 lb-mole, or 11.34 lb. Thus the amount of steam used to produce one pound of n-dodecane is 11.34/61.4=0.18 lbs.

Because the steam requirements are reduced, there is a substantial energy savings in heat of vaporization relative to operating the process near atmospheric pressure. Moreover, because the amount of steam required per quantity of contaminant is reduced, the decontamination process can be applied in soils which have a low in-situ moisture content or a high contaminant level relative to moisture content. Unlike other decontamination processes that rely on electrical conduction through the soil, this invention relies only on thermal conduction through the soil. It can therefore be applied in completely dry soils and at temperatures beyond the boiling point of water. Moreover, thermal conduction results in a more uniform heating of the soil than electrical conduction because there is substantially less variation and less heterogeneity in the thermal conductivity of soils than there is in the electrical conductivity of soils.

Figure 5:
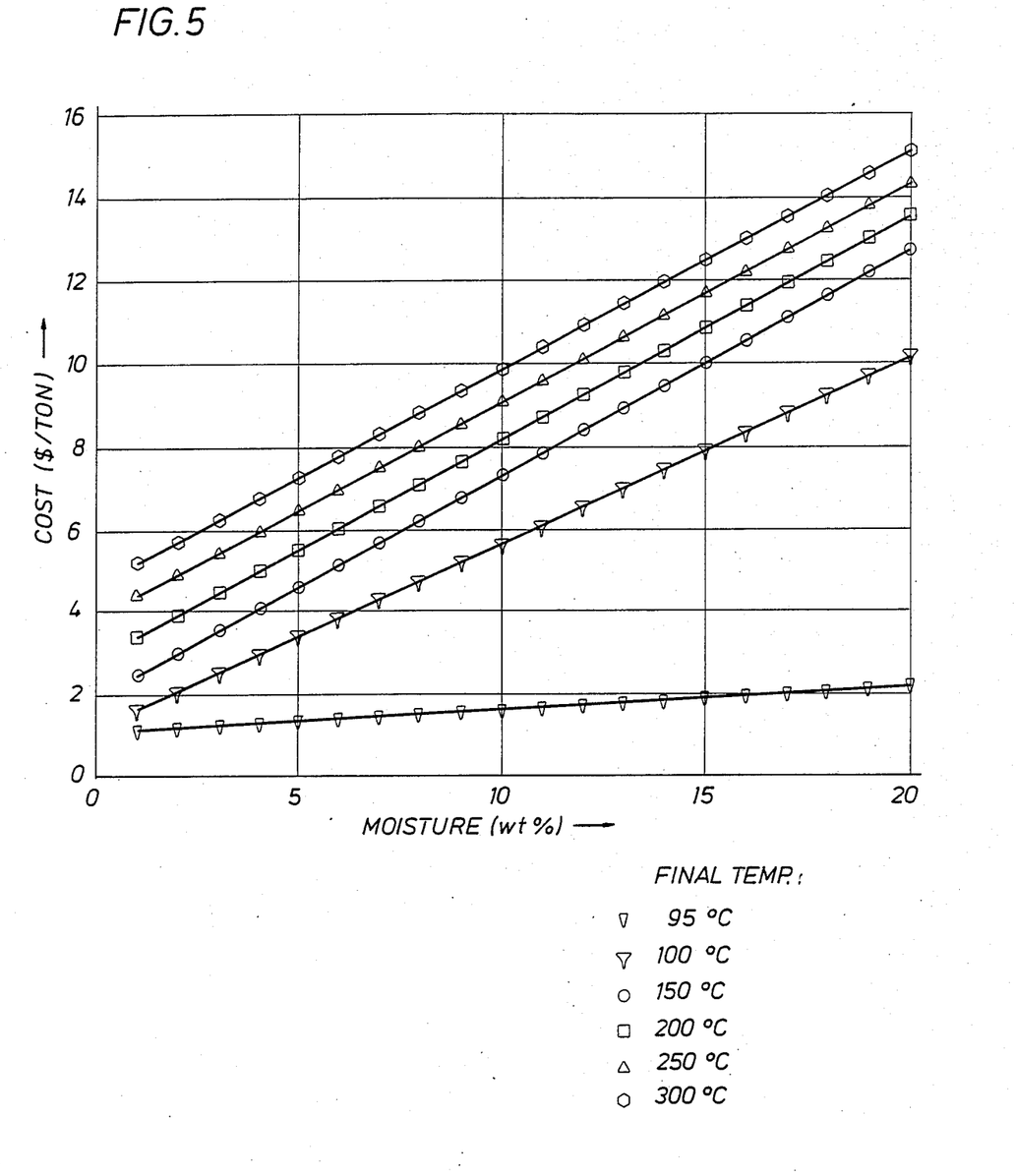
FIG. 5 shows the cost per ton to raise soil to various temperatures as a function of initial moisture content in the soil.

Referring now to FIG. 5, there is shown the cost in dollars per ton to raise soil to various final temperatures as a function of moisture content of the soil. The assumptions are: (a) electrical costs of $0.055 per KWh; (b) initial temperature of 21° C.; and (c) 75% energy contained in the region to be decontaminated. For soil with original moisture content of 5%, the electrical cost will be only about $6.50/ton to raise the temperature to 250° C. The capital costs and other operating costs are also substantially lower than other decontamination processes.

Various modifications of the present invention will become apparent to those skilled in the art from the foregoing description. Such modifications are intended to fall within the scope of the appended claims.

What is claimed is:

1. A method for remediation and decontamination of surface and near-surface soils comprising:
   placing an electric surface heater on the soil surface;
   placing a permeable mat above the surface heater;
   placing an impermeable sheet above the permeable mat;
   applying a vacuum to the soil through an opening in the impermeable sheet;
   heating the soil by thermal conduction with the surface heater;
   vaporizing the contaminants in the soil; and
   recovering contaminants from the soil through a vacuum collection system.

2. The method of claim 1 wherein the vaporization of contaminants occurs at a temperature below the normal boiling points of the contaminants.

3. The method of claim 1, comprising the additional step of applying a vacuum to the soil to remove excess water from the soil before heating the soil.

4. The method of claim 1, wherein the surface heater is a mesh of electrically conductive wires.

5. The method of claim 1 wherein the soil is heated to a temperature sufficient to decompose the contaminants into decomposition products, and wherein the decomposition products, and any contaminants not decomposed, are recovered through the vacuum collection system.

6. The method of claim 1 wherein the surface heater is operated at a temperature sufficient to decompose the contaminants into decomposition products as they pass through the heater, and wherein the decomposition products, and any contaminants not decomposed, are recovered through the vacuum collection system.

7. The method of claim 6 comprising the additional step of placing a layer of catalyst between the surface heater and the permeable mat to accelerate the decomposition of contaminants.

8. The method of claim 1, comprising the additional step of supplying a decomposition reactant to the soil to decompose the contaminants into decomposition products, and wherein the decomposition products, and any contaminants not decomposed, are recovered through the vacuum collection system.

9. A method for remediation and decontamination of surface and near-surface soils comprising:
    placing an electric surface heater on the soil surface;
    placing a permeable mat above the surface heater;
    placing a thermal insulation layer above the permeable mat;
    placing an impermeable sheet above the thermal insulation layer;
    applying a vacuum to the soil through an opening in the impermeable sheet;
    heating the soil by thermal conduction with the surface heater;
    vaporizing contaminants in the soil; and
    recovering the contaminants from the soil through a vacuum collection system.

10. The method of claim 9 wherein the vaporization of contaminants occurs at a temperature below the normal boiling points of the contaminants.

11. The method of claim 9, comprising the additional step of applying a vacuum to the soil to remove excess water from the soil before heating the soil.

12. The method of claim 9, wherein the surface heater is a mesh of electrically conductive wires.

13. The method of claim 9 wherein the soil is heated to a temperature sufficient to decompose the contaminants into decomposition products, and wherein the decomposition products, and any contaminants not decomposed, are recovered through the vacuum collection system.

14. The method of claim 13, comprising the additional step of supplying a decomposition reactant to the soil to decompose the contaminants into decomposition products, and wherein the decomposition products, and any contaminants not decomposed, are recovered through the vacuum collection system.

15. The method of claim 9 wherein the surface heater is operated at a temperature sufficient to decompose the contaminants into decomposition products as they pass through the heater, and wherein the decomposition products, and any contaminants not decomposed, are recovered through the vacuum collection system.

16. The method of claim 15 comprising the additional step of placing a layer of catalyst between the surface heater and the permeable mat to accelerate the decomposition of contaminants.

17. The method of claim 9, comprising the additional step of supplying a decomposition reactant to the soil to decompose the contaminants into decomposition products, and wherein the decomposition products, and any contaminants not decomposed, are recovered through the vacuum collection system.

18. A method for remediation and decontamination of surface and near-surface soils comprising:
    placing an electric surface heater on the soil surface;
    placing a permeable mat above the surface heater;
    placing a thermal insulation layer above the permeable mat;
    placing an impermeable sheet above the thermal insulation layer;
    applying a vacuum to the soil through an opening in the impermeable sheet;
    heating the soil by thermal conduction with the surface heater to a temperature sufficient to decompose at least some of the contaminants into decomposition products;
    vaporizing contaminants in the soil that are not decomposed by heating; and
    recovering the decomposition products, and any contaminants not decomposed, from the soil through a vacuum collection system.

19. The method of claim 18 comprising the additional step of placing a thermal insulation layer above the impermeable sheet.

20. A system for remediation and decontamination of surface and near-surface soils comprising:
    an electric surface heater on the soil surface;
    a permeable mat above the surface heater;
    an impermeable sheet above the permeable mat; and
    a vacuum collection system for recovering contaminants from the soil through an opening in the impermeable sheet.

21. The system of claim 20, wherein the surface heater is a mesh of electrically conductive wires.

22. The system of claim 20 comprising a layer of catalyst between the surface heater and the permeable mat to accelerate the decomposition of contaminants.

23. A system for remediation and decontamination of surface and near-surface soils comprising:
    an electric surface heater on the soil surface;
    a permeable mat above the surface heater;
    a thermal insulation layer above the permeable mat;
    an impermeable sheet above the thermal insulation layer; and
    a vacuum collection system for recovering contaminants from the soil through an opening in the impermeable sheet.

24. The system of claim 23, wherein the surface heater is a mesh of electrically conductive wires.

25. The system of claim 23 comprising a layer of catalyst between the surface heater and the permeable mat to accelerate the decomposition of contaminants.

26. The system of claim 23 comprising a thermal insulation layer above the impermeable sheet.

* * * * *